US008521219B2

(12) United States Patent
Mori

(10) Patent No.: US 8,521,219 B2
(45) Date of Patent: Aug. 27, 2013

(54) RADIO COMMUNICATION DEVICE AND DATA RECEPTION METHOD TO RECEIVE CONTENT DATA BEING BROADCAST VIA RADIO WAVES

(75) Inventor: Daisuke Mori, Kanagawa (JP)

(73) Assignee: Kyocera Corporation, Kyoto (JP)

( * ) Notice: Subject to any disclaimer, the term of this patent is extended or adjusted under 35 U.S.C. 154(b) by 0 days.

(21) Appl. No.: 13/257,890

(22) PCT Filed: Mar. 26, 2010

(86) PCT No.: PCT/JP2010/055352
§ 371 (c)(1),
(2), (4) Date: Sep. 20, 2011

(87) PCT Pub. No.: WO2010/110418
PCT Pub. Date: Sep. 30, 2010

(65) Prior Publication Data
US 2012/0015688 A1    Jan. 19, 2012

(30) Foreign Application Priority Data

Mar. 26, 2009 (JP) ................................. 2009-077620
Mar. 26, 2009 (JP) ................................. 2009-077653

(51) Int. Cl.
*H04M 1/00* (2006.01)
(52) U.S. Cl.
USPC ........................................ 455/550.1; 455/403
(58) Field of Classification Search
USPC .............................................. 455/403, 550.1
See application file for complete search history.

(56) References Cited

U.S. PATENT DOCUMENTS

| 6,006,101 | A | * | 12/1999 | Sakamoto ..................... 455/517 |
| 7,865,195 | B2 | | 1/2011 | Uemura et al. |
| 7,899,435 | B2 | | 3/2011 | Yano |
| 2004/0097268 | A1 | * | 5/2004 | Kurokawa et al. ............ 455/561 |

(Continued)

FOREIGN PATENT DOCUMENTS

| JP | 6-125246 A | 5/1994 |
| JP | 2004-172772 A | 6/2004 |

(Continued)

OTHER PUBLICATIONS

Taku et al., English Machine Translation of Japaneses Patent Application No. JP 2005-236341 A, Sep. 2005.*

(Continued)

*Primary Examiner* — Rafael Pérez-Gutiérrez
*Assistant Examiner* — Liton Miah
(74) *Attorney, Agent, or Firm* — Hoffmann & Baron, LLP

(57) ABSTRACT

A wireless communication device which can receive broadcast multi-casted data without sending a radio wave, and data reception method of the same. A mobile phone (1) is provided with a storage unit (34) which stores the time that BCMCS transmission takes place; a communication unit (31) which is compliant with CDMA2000_1x and EVDO which allows for acquisition of the channel of the BCMCS transmission; and a control unit (30) which performs control so that the communication unit (31) begins to receive BCMCS transmitted content data, using EVDO, at the time stored in the storage unit (34). When in a state where an instruction has been made to shift to a radio wave non-sending state in which radio waves are not sent, the control unit (30) does not use CDMA2000_1x when the content data is being received at the time stored in the storage unit (34).

6 Claims, 7 Drawing Sheets

(56) References Cited

U.S. PATENT DOCUMENTS

| | | | |
|---|---|---|---|
| 2005/0245207 A1* | 11/2005 | Suzuki et al. | 455/101 |
| 2006/0067268 A1* | 3/2006 | Lee et al. | 370/328 |
| 2008/0020799 A1* | 1/2008 | Itamiya et al. | 455/558 |
| 2008/0272934 A1* | 11/2008 | Wang et al. | 340/870.11 |
| 2008/0318642 A1* | 12/2008 | Tanaka | 455/572 |

FOREIGN PATENT DOCUMENTS

| | | |
|---|---|---|
| JP | 2005-236341 A | 9/2005 |
| JP | 2006-245930 A | 9/2006 |
| JP | 2007-318609 A | 12/2007 |
| JP | 2007-329961 A | 12/2007 |
| WO | 2007/032317 A1 | 3/2007 |

OTHER PUBLICATIONS

Shigeki, English Machine Translation of Japaneses Patent Application No. JP 06-125246 A, May 1994.*
International Search Report for PCT/JP2010/05535, mailed Apr. 27, 2010.
Notice of Reasons for Rejection issued to JP Application No. 2009-077620, mailed Nov. 13, 2012.
Decision of Rejection issued to JP Application No. 2009-077620, mailed May 7, 2013.

* cited by examiner

SCHEDULE TABLE

| EVENT | START DATE AND TIME | FINISH DATE AND TIME | POWER OFF |
|---|---|---|---|
| HOSPITAL | 2009/03/14 13:00 | 2009/03/14 15:15 | YES |
| MOVIE THEATER | 2009/03/21 13:00 | 2009/03/21 15:30 | YES |
| RESTAURANT | 2009/03/21 19:00 | 2009/03/21 21:00 | NO |
| ... | ... | ... | ... |

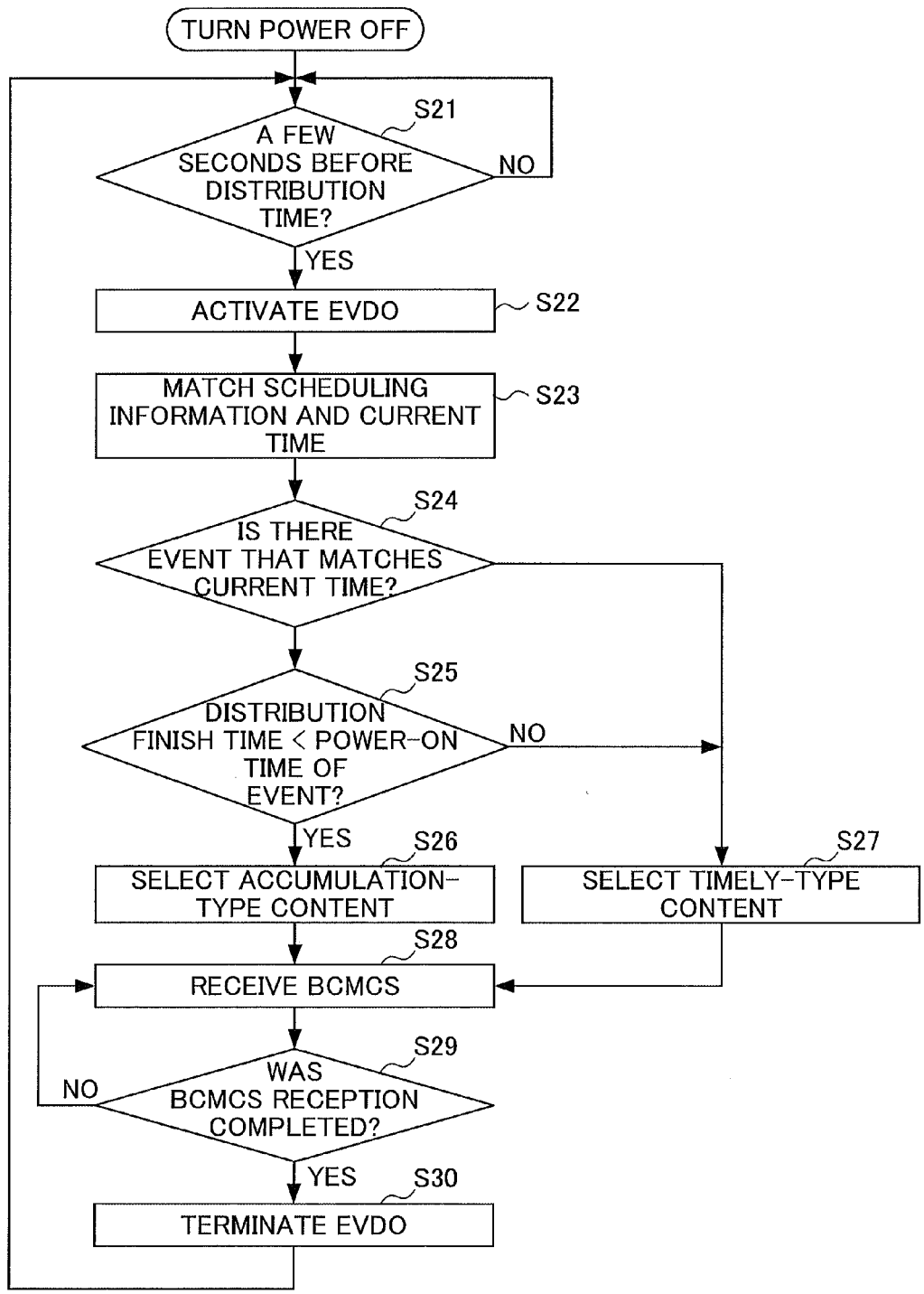

RADIO COMMUNICATION DEVICE AND DATA RECEPTION METHOD TO RECEIVE CONTENT DATA BEING BROADCAST VIA RADIO WAVES

CROSS-REFERENCE TO RELATED APPLICATIONS

This application is the National Stage of International Application No. PCT/JP2010/055352, filed Mar. 26, 2010, which claims the benefit of Japanese Application No. 2009-077620, filed Mar. 26, 2009 and Japanese Application No. 2009-077653, filed Mar. 26, 2009, the entire contents of all of which are incorporated by reference herein.

FIELD OF THE INVENTION

The present invention relates to a radio communication device and a data reception method for receiving broadcast data.

BACKGROUND OF THE INVENTION

Conventionally, in a radio communication device such as a cellular telephone device, there exist a plurality of communication systems such as, for example, the CDMA2000_1x standard that enables a voice call, and the CDMA2000_1x_EVDO (Evolution Data Only or Evolution Data Optimized) standard that is exclusively used for data communication.

Moreover, a broadcast service called BCMCS (Broadcast Multicast Service) is provided in the EVDO standard. In BCMCS, content data is simultaneously distributed to radio communication devices within a communications area of CDMA2000_1x_EVDO. A radio communication device prospectively registers information of contents that are desired to be received. In addition, at the distribution start time of the registered content, a radio communication device receives broadcasting information that is periodically transmitted within a distribution area, and starts receiving the content data upon confirming the fact that the registered content is being distributed.

However, the data reception is interrupted when the power of the radio communication device is turned off, and in addition, reception is not started while the power is off during the distribution period. In BCMCS, when data reception failed within a predetermined period of time, it is required to establish communication with the server again to receive data; therefore, such a data request involves extra operations and charging. Accordingly, a method is conceivable, in which data is received and accumulated even while the power is off (for example, see Patent Document 1).

Patent Document 1: Japanese Unexamined Patent Application, Publication No. 2007-329961

SUMMARY OF THE INVENTION

Problems to be Solved by the Invention

However, in the method of Patent Document 1, since data is received while the power is off, there arises data uploaded for authentication and the like with a base station. As a result, since radio waves are transmitted from a radio communication device, such a radio communication device cannot be used in places such as a hospital and a train where radio wave transmission is regulated. In other words, it was not possible to employ this method in a state where an instruction is provided not to transmit radio waves, such as in a state of turning off the power or in a state of turning off the radio waves for restricted communication.

An object of the present invention is to provide a radio communication device and a data reception method, which can receive broadcast data without transmitting radio waves.

Means for Solving the Problems

The radio communication device according to the present invention is a radio communication device that receives content data being broadcast via radio waves, and the radio communication device includes: a first storage unit that stores time such broadcasting is performed; a communication unit that is compatible with a first communication protocol that can capture a channel of the broadcasting, and a second communication protocol different from the first communication protocol; and a control unit that controls the communication unit to start receiving the content data being broadcast, by using the first communication protocol, at the time stored in the first storage unit; in which the control unit does not use the second communication protocol when receiving the content data at the time stored in the first storage unit, in a state of having been instructed to transition to a non-radio-wave-transmission state in which radio waves are not transmitted.

Moreover, it is preferable for the control unit to cause the communication unit to start scanning the channel by using the first communication protocol at time that is a first period of time before the time stored in the first storage unit.

In addition, it is preferable for the content data being broadcast to be data designated by way of broadcasting information transmitted in a second time cycle, on the channel.

Furthermore, it is preferable for the communication unit to capture the channel, and thereafter to receive the broadcasting information by maintaining a continuous reception state for at least the second time on the channel, and it is preferable for the control unit to start receiving the content data being broadcast, based on the broadcasting information.

Moreover, when the content data being broadcast is received by using the first communication protocol in the state of having been instructed to transition to the non-radio-wave-transmission state, it is preferable for the control unit to control the communication unit to not perform transmission.

In addition, it is preferable for the control unit to establish a communication session in the non-radio-wave-transmission state by using a parameter obtained before being instructed to transition to the non-radio-wave-transmission state.

Furthermore, it is preferable for the radio communication device according to the present invention to further include a second storage unit for storing a schedule that is input, in which, in a state of having been instructed to transition to the non-radio-wave-transmission state, when detecting that reception time stored in the first storage unit has come for first content data, it is preferable for the control unit to refer to the schedule stored in the second storage unit, and in a case in which an event that is in progress at the reception time is registered, it is preferable for the control unit to control the communication unit to not receive the first content data if there is a possibility that the event may result in an operation involving transmission of radio waves before finish time of the broadcasting, and it is preferable for the control unit to control the communication unit to receive the first content data if there is not a possibility that the event may result in an operation involving transmission of radio waves before finish time of the broadcasting.

Moreover, it is preferable for the second storage unit to store data that indicates time of transitioning to the non-radiowave-transmission state, and time of cancelling the non-radio-wave-transmission state, in association with the schedule, and it is preferable for the control unit to determine that there is a possibility that an operation involving transmission of radio waves may occur at the time of cancelling the non-radio-wave-transmission state.

In addition, it is preferable for the non-radio-wave-transmission state to be a power-off state, it is preferable for the second storage unit to store data that indicates time of power-off and power-on of its own device in association with the schedule, and it is preferable for the control unit to determine that there is a possibility that an operation involving transmission of radio waves may occur at time of switching from power-off to power-on.

Furthermore, it is preferable for the communication unit to obtain finish time of the broadcasting by prospectively identifying a period of time required to complete reception of the first content data.

Moreover, in a case in which an event that is in progress at the reception time of the first content data is not registered, it is preferable for the control unit to determine that there is a possibility that the operation involving transmission of radio waves may occur before the finish time of the broadcasting, and not to receive the first content data.

In addition, in a case in which the control unit does not receive the first content data based on determining that there is a possibility that the operation involving transmission of radio waves may occur before the finish time of the broadcasting, it is preferable for the control unit to select and receive second content data that is content data with no more than predetermined volume.

Furthermore, it is preferable for the first communication protocol to be a protocol exclusively used for data communication, and it is preferable for the second communication protocol to be a voice communication protocol that also supports a voice call.

The data reception method according to the present invention is a data reception method in a radio communication device for receiving content data being broadcast via radio waves, the data reception method includes the steps of: storing time such broadcasting is performed; communicating with a public communication network by using both of a first communication protocol that can capture a channel of the broadcasting, and a second communication protocol different from the first communication protocol; and performing control so as to start receiving the content data being broadcast, by using the first communication protocol, at the time stored in the step of storing, in which the step of performing control does not use the second communication protocol when receiving the content data at the time stored in the step of storing, in a state of having been instructed to transition to a non-radio-wave-transmission state in which radio waves are not transmitted.

Moreover, it is preferable for the step of performing control to perform control so as to use only the first communication protocol when receiving the content data at the time stored in the step of storing, in a state of having been instructed to transition to a non-radio-wave-transmission state in which radio waves are not transmitted.

In addition, in the data reception method according to the present invention, it is preferable for the first communication protocol to be a protocol exclusively used for data communication, and it is preferable for the second communication protocol to be a voice communication protocol that also supports a voice call.

Effects of the Invention

According to the present invention, the radio communication device can receive broadcast data without transmitting radio waves.

BRIEF DESCRIPTION OF THE DRAWINGS

FIG. 3 is a flowchart showing processing of BCMCS reception in a case in which the power of the cellular telephone device according to the first embodiment is ON;

FIG. 8 is a flowchart showing processing of BCMCS reception in a case in which the power of the cellular telephone device according to the second embodiment is OFF.

Figure 1:
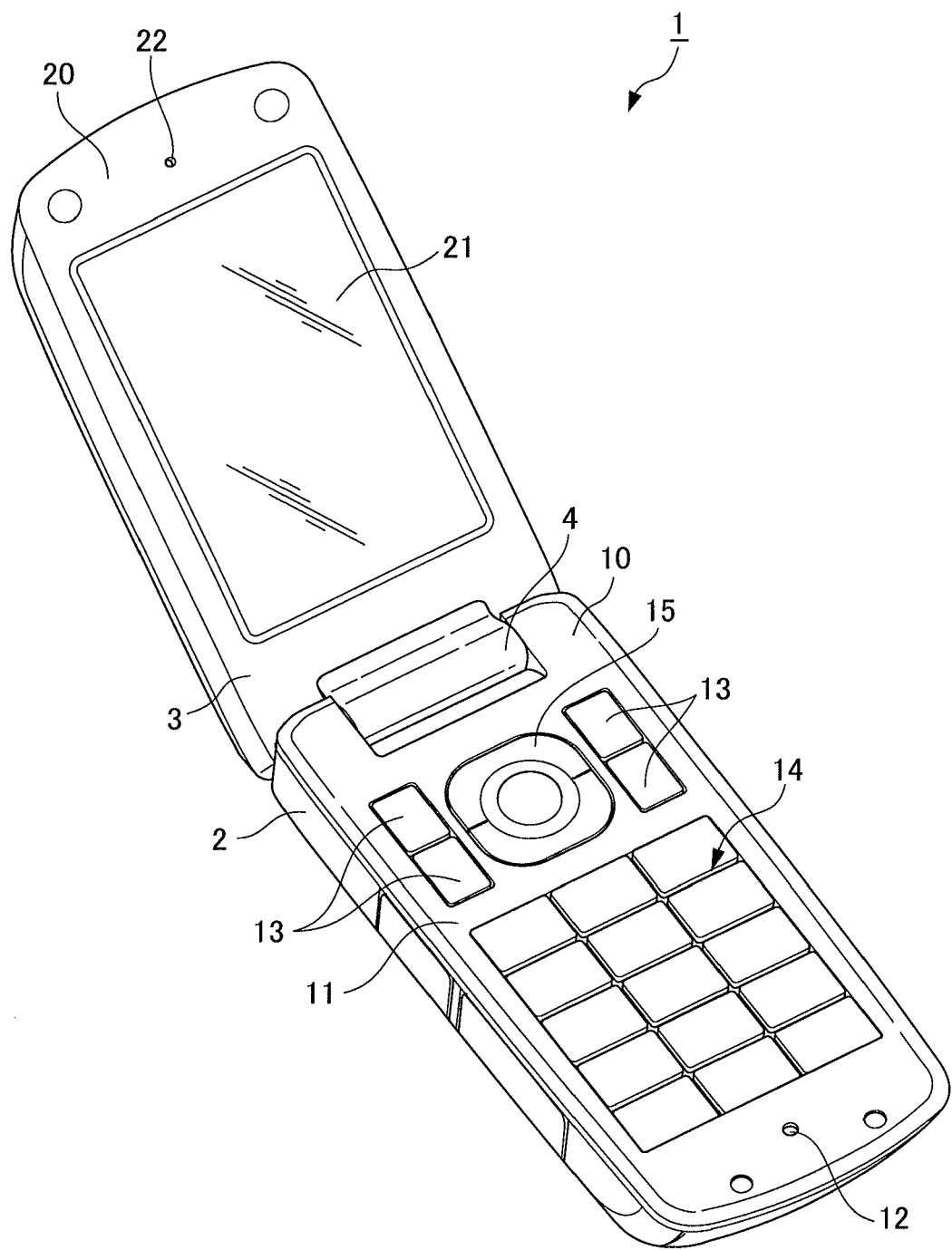
FIG. 1 is a perspective view showing an appearance of a cellular telephone device according to a first embodiment.

EXPLANATION OF REFERENCE NUMERALS 1 cellular telephone device (radio communication device)
11 operation unit
21 display unit
30 control unit
31 communication unit
32 antenna
33 sound control unit
34 storage unit (first storage unit, second storage unit)

DETAILED DESCRIPTION OF THE INVENTION

First Embodiment

Descriptions are provided hereinafter regarding a first embodiment of the present invention. It should be noted that, in the present embodiment, a cellular telephone device 1 is described as an example of a radio communication device. It should be noted that the radio communication device of the present invention is not limited thereto, and can be applied to various radio communication devices such as, for example, a PHS and a PDA (Personal Digital Assistant), a navigation device and a personal computer provided with a communication function, and in addition, a communication module connected thereto.

FIG. 1 is a perspective view showing an appearance of a cellular telephone device 1 (radio communication device) according to the present embodiment. It should be noted that, although FIG. 1 shows a so-called folder-type cellular telephone device, a type of the cellular telephone device according to the present invention is not limited thereto. For example, the cellular telephone device may be of: a slider type in which one of the bodies slides to one direction in a state in which the bodies are mutually superimposed; a rotating (turning) type in which one of the bodies is rotated around an axis line along the direction of superimposing the bodies; and a type (straight type) in which an operation unit and a display unit are disposed in one body without having a connecting portion.

The cellular telephone device 1 is configured to include an operation unit side body 2 and a display unit side body 3. The operation unit side body 2 is configured to include, on a front face portion 10 thereof, an operation unit 11 and a microphone 12 to which sound produced by a user of the cellular telephone device 1 during a phone call is input. The operation unit 11 is configured with: function setting operation buttons 13 for operating various functions such as for various setting functions, a telephone number directory function and a mail function; input operation buttons 14 for inputting the digits of a telephone number and characters for mail, etc.; and a selection operation button 15 for performing selection of various operations, scrolling, etc.

Moreover, the display unit side body 3 is configured to include, on a front face portion 20, a display unit 21 for displaying a variety of information, and a receiver 22 for outputting sound of the other party of the conversation.

In addition, an upper end portion of the operation unit side body 2 and a lower end portion of the display unit side body 3 are connected via a hinge mechanism 4. Furthermore, the cellular telephone device 1 can be arranged into a state where the operation unit side body 2 and the display unit side body 3 are apart from each other (opened state), and into a state where the operation unit side body 2 and the display unit side body 3 are contacting each other (folded state), by relatively rotating the operation unit side body 2 and the display unit side body 3, which are connected via the hinge mechanism 4.

Figure 2:
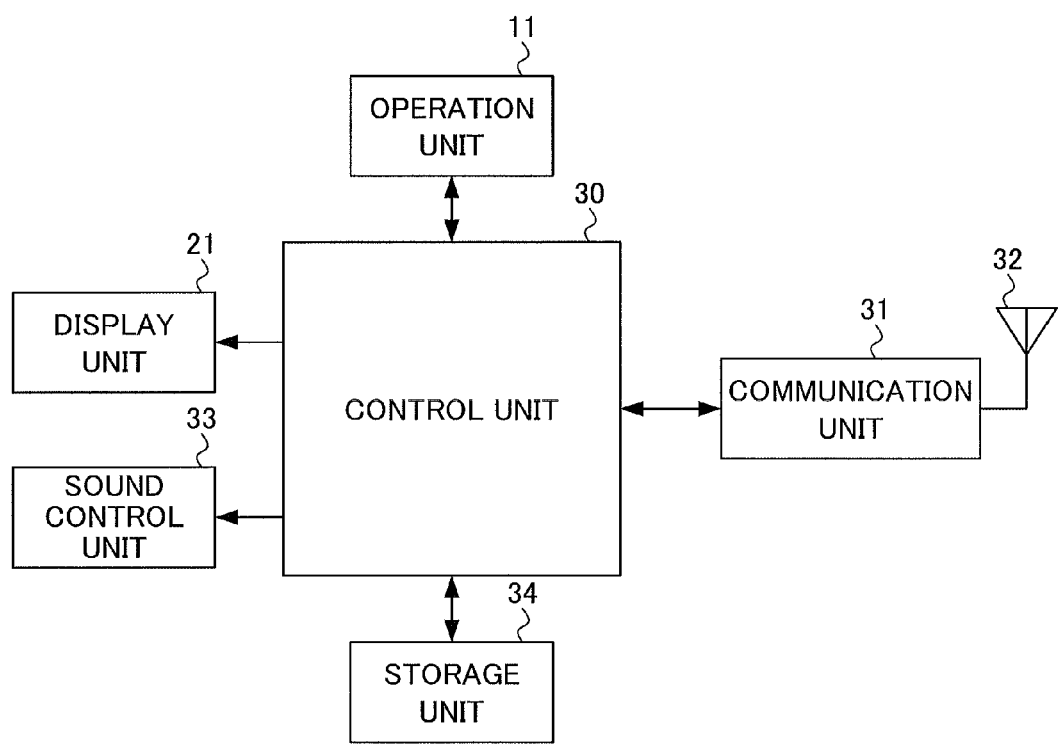
FIG. 2 is a block diagram showing functions of the cellular telephone device according to the first embodiment.

FIG. 2 is a block diagram showing functions of the cellular telephone device 1 according to the present embodiment. The cellular telephone device 1 includes the operation unit 11, the display unit 21, a control unit 30, a communication unit 31, an antenna 32, a sound control unit 33, and a storage unit 34 (a first storage unit and a second storage unit).

The control unit 30 controls the entirety of the cellular telephone device 1, and performs, for example, predetermined control of the display unit 21, the communication unit 31, the sound control unit 33 and the like. Moreover, the control unit 30 accepts input from the operation unit 11 and the like to perform a variety of processing. In addition, when executing such processing, the control unit 30 controls the storage unit 34 to read various programs and data and write data.

The communication unit 31 communicates with external devices (base stations) at a predetermined usable frequency band (for example, 2 GHz band, 800 MHz band, and the like). Furthermore, the communication unit 31 performs demodulation processing on a signal received via the antenna 32 and provides the signal thus processed to the control unit 30, and in addition, performs modulation processing on a signal provided from the control unit 30 and transmits the signal to an external device via the antenna 32.

Here, the communication unit 31 is compatible with both of EVDO (first communication protocol) that is a communication protocol exclusively used for data communication, and CDMA2000_1x (second communication protocol) that is a voice communication protocol for providing a voice call. Based on an instruction from the control unit 30, the communication unit 31 performs communication by way of one of the communication protocols. Furthermore, communication may be performed by way of both the communication protocols through, for example, time sharing. In the present embodiment, the communication unit 31 receives BCMCS distribution data (content data) through EVDO.

In accordance with control by the control unit 30, the sound control unit 33 performs predetermined sound processing on a signal provided from the communication unit 31, and outputs the signal thus processed to the receiver 22. The receiver 22 externally outputs the signal provided from the sound control unit 33. It should be noted that the signal may be output from a speaker (not illustrated) in place of the receiver 22 or in addition to the receiver 22.

Moreover, in accordance with control by the control unit 30, the sound control unit 33 processes a signal, which is input from the microphone 12, and outputs the signal thus processed to the communication unit 31. The communication unit 31 performs predetermined processing on the signal provided from the sound control unit 33, and outputs the signal thus processed from the antenna 32.

The storage unit 34 includes, for example, working memory, and is utilized for arithmetic processing by the control unit 30. In addition, the storage unit 34 stores various programs, parameters and the like according to the present embodiment. It should be noted that the storage unit 34 may also serve as detachable external memory.

Here, descriptions are provided for BCMCS service contents. There are two general types of BCMCS services. The first one is accumulation-type content distribution, and the second one is timely distribution.

Firstly, in the former case, a user in general prospectively makes a contract with a content provider regarding information distribution. The content provider notifies each user under the contract of the data distribution time. In this way, by continually receiving data transmitted from a base station through the EVDO protocol at the time that was notified in advance, a terminal obtains necessary information. It should be noted that the size of data distributed in this case is apparently larger than that in the case of timely distribution, and the duration for receiving the data may extend for more than several minutes. Accordingly, there is a trend toward distributing such data in late-night hours when the traffic load is small and the users may perform operations less frequently.

Next, the latter is a service that is frequently used for distributing data of a small size such as weather forecast and fragmentary topical news. Although this service also starts a receiving operation at designated time by using the EVDO protocol, a period of time required for the reception is considerably different from the former. More specifically, although the time depends on the communication technology level and the traffic situation in each occasion, the former may take a few minutes to dozens of minutes, whereas the latter may take about a few seconds to dozens of seconds. In addition, the latter performs an operation to receive data at designated time, for example, in a one-hour cycle.

Case of Power ON

Figure 3:
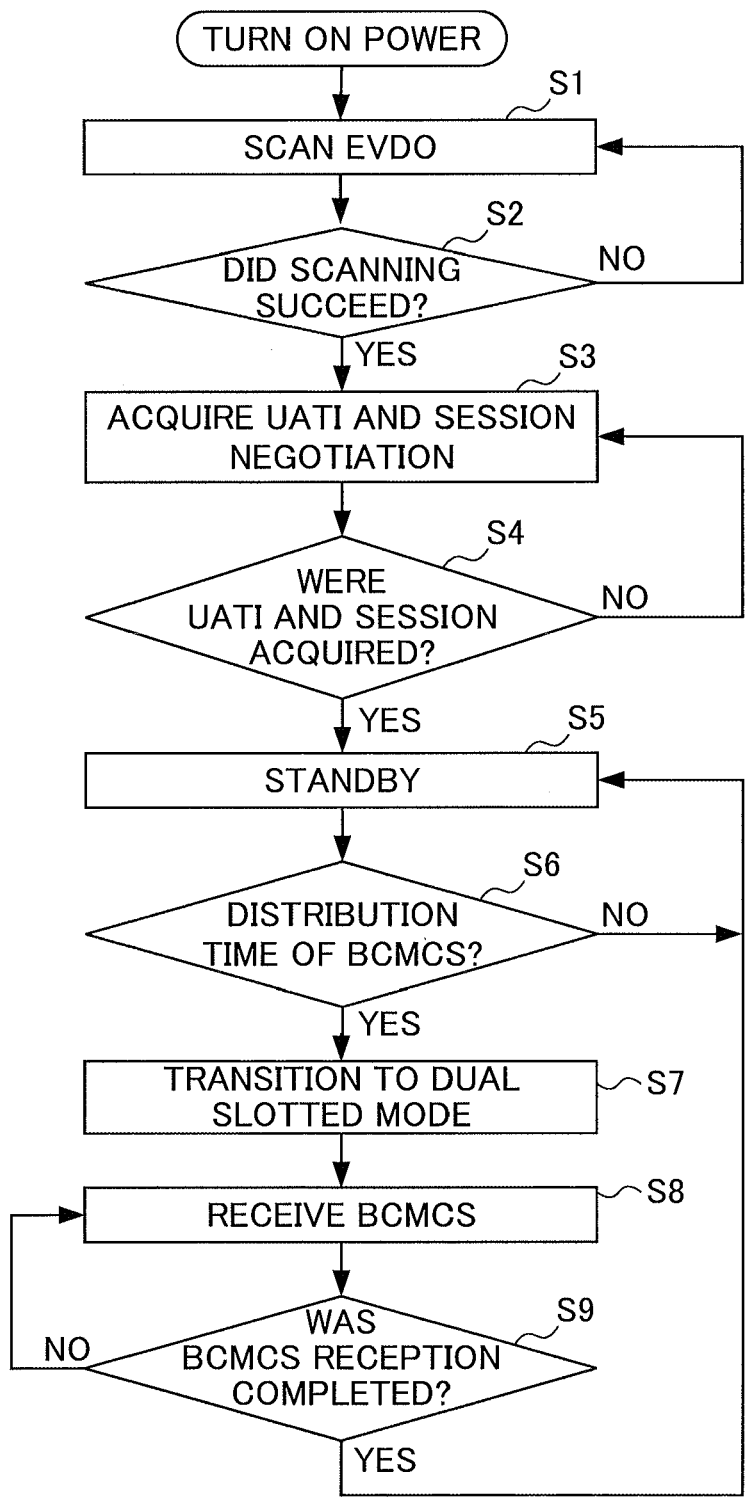

FIG. 3 is a flowchart showing processing of BCMCS reception in a case in which the power of the cellular telephone device 1 according to the present embodiment is ON.

In Step S1, the control unit 30 starts scanning a frequency channel that enables EVDO communication. At this point in time, in accordance with a frequency list called PRL stored in the storage unit 34, the control unit 30 sequentially scans frequency within a band class in a preferential order of the band class, and captures a frequency channel having at least predetermined electric field intensity.

Incidentally, in the CDMA2000_1x standard and the EVDO standard, there exist a plurality of usable frequency channels in each communication system, i.e. within a single frequency band (band class). Furthermore, in Japan, although only a so-called old 800 MHz band of Band Class 3 has been conventionally serving for the CDMA2000_1x standard, usable band classes have currently been added as a result of reassessment of the frequency bands. In other words, a so-called new 800 MHz band is usable as a result of reassessment to replace the frequency bands for uploading and downloading, and to make the frequency channels conform to Band Class 0, and a 2 GHz band of high-frequency Band Class 6 is usable.

In Step S2, the control unit 30 determines whether the scanning of EVDO in Step S1 succeeded. In a case in which the determination is YES, the capturing of a frequency channel that enables EVDO communication succeeded, and thus the processing advances to Step S3. On the other hand, in a case in which the determination is NO, the processing returns to Step S1 to continue scanning of frequency channels.

In Step S3, the control unit 30 acquires UATI (Unicast Access Terminal Identifier) that is a unique ID for identifying the cellular telephone device 1, and performs session negotiation. Through this session negotiation, the control unit 30 determines intermittent reception timing for BCMCS broadcasting information.

In Step S4, the control unit 30 determines whether the acquisition of UATI and the session succeeded in Step S3. In a case in which the determination is YES, the processing advances to Step S5, and in a case in which the determination is NO, the processing in Step S3 is continued.

In Step S5, since the connection was established through EVDO, the control unit 30 starts standby for a control channel including a communication request.

In Step S6, the control unit 30 determines whether the present time is the distribution time of BCMCS contents that are desired to be received, in which the distribution time is stored in the storage unit 34 in advance. In a case in which the determination is YES, the processing advances to Step S7, and in a case in which the determination is NO, the standby in Step S5 is continued.

In Step S7, by way of the standby for EVDO that was started in Step S5 as well as attempting to receive BCMCS broadcasting information at the intermittent reception timing that was determined in Step S3, the control unit 30 transitions to a Dual Slotted Mode.

Based on the BCMCS broadcasting information received in Step S7, when the control unit 30 confirms the fact that the BCMCS contents that are desired to be received are being distributed, the control unit 30 starts receiving data in Step S8.

In Step S9, the control unit 30 determines whether the data reception in Step S8 is completed. In a case in which the determination is YES, the processing returns to Step S5 to resume standby for EVDO. On the other hand, in a case in which the determination is NO, the data reception in Step S8 is continued.

Case of Power OFF

Figure 4:
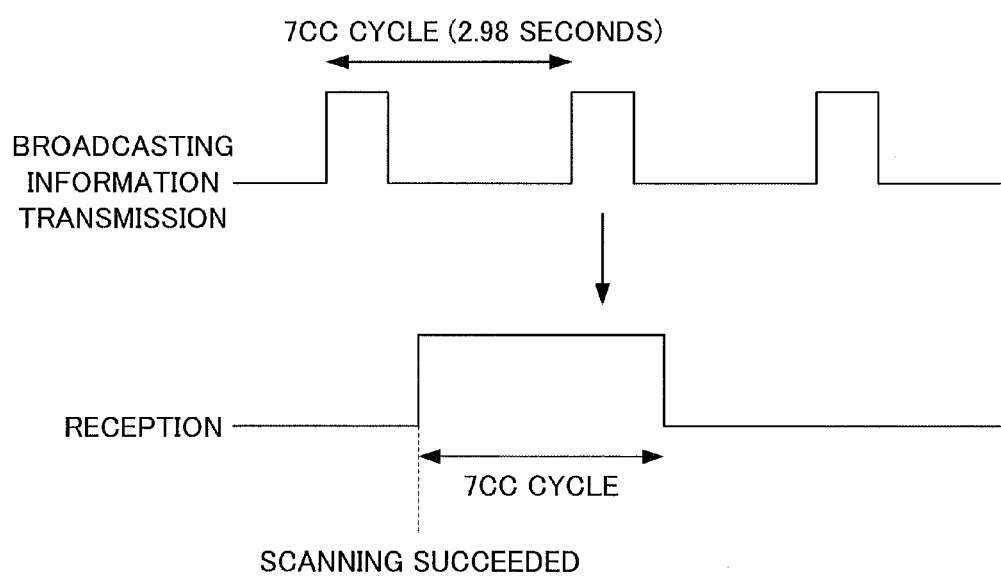
FIG. 4 is a diagram showing a method for receiving BCMCS broadcasting information according to the first embodiment.

Next, descriptions are provided for processing of BCMCS reception in a case in which the power of the cellular telephone device 1 is OFF. FIG. 4 is a diagram showing a method for receiving BCMCS broadcasting information according to the present embodiment.

The base station transmits broadcasting information in a predetermined cycle (second time cycle), more specifically in a 7 CC cycle (2.98 seconds). The cellular telephone device 1 does not perform session negotiation involving transmission of radio waves, and thus cannot be aware of transmission timing of the broadcasting information.

Accordingly, after succeeding the scanning of EVDO, the control unit 30 maintains a continuous reception state for at least 7 CC cycle. As a result, broadcasting information can be received at least once during the continuous reception state, thereby making it possible to start receiving BCMCS data.

Figure 5:
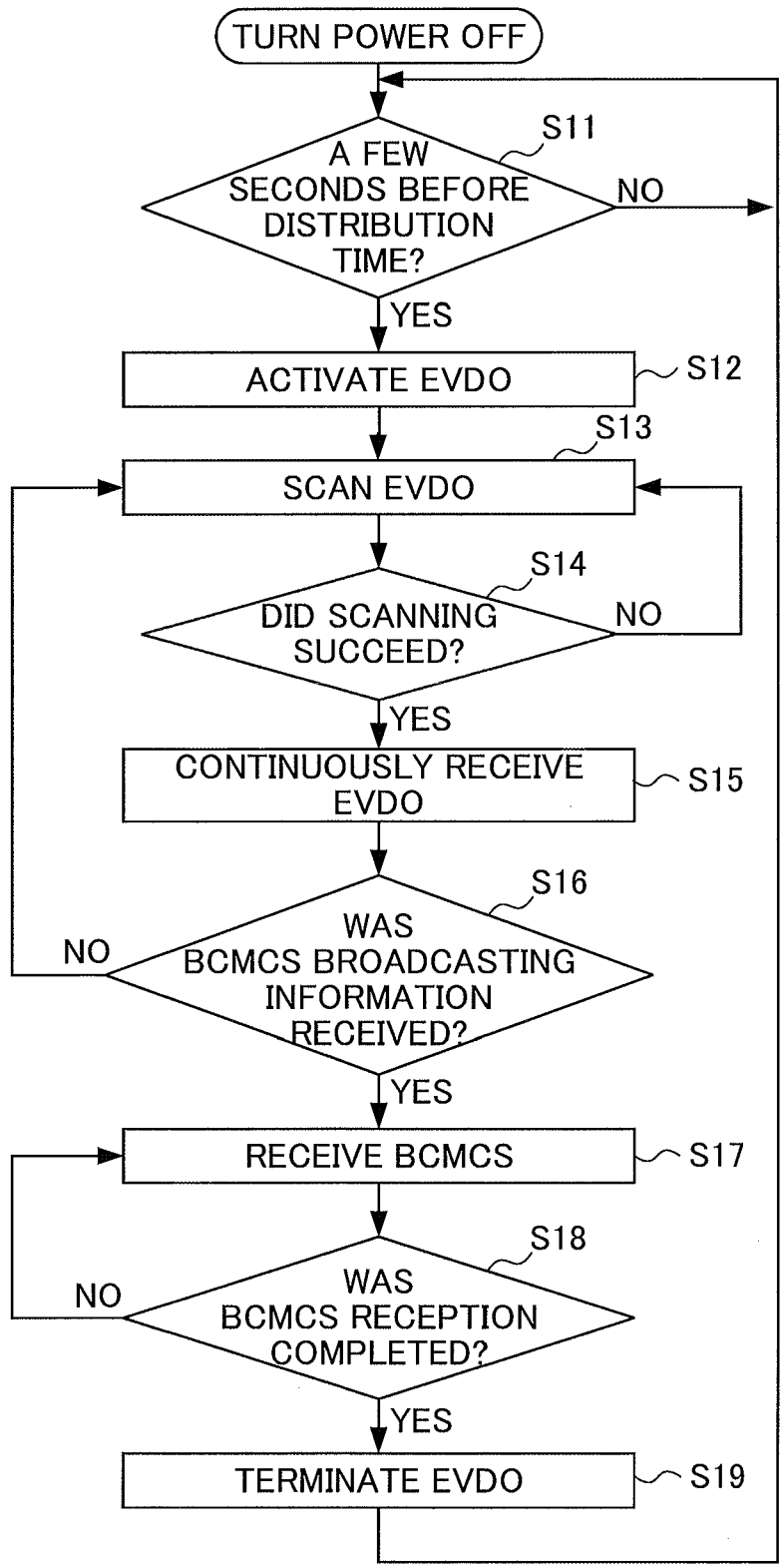
FIG. 5 is a flowchart showing processing of BCMCS reception in a case in which the power of the cellular telephone device according to the first embodiment is OFF.

FIG. 5 is a flowchart showing processing of BCMCS reception in a case in which the power of the cellular telephone device 1 according to the present embodiment is OFF.

In Step S11, the control unit 30 determines whether the distribution time of BCMCS contents that are desired to be received is approaching, in which the distribution time is stored in the storage unit 34 in advance. More specifically, the control unit 30 determines whether there is a predetermined period of time (first period of time), about a few seconds to 1 minute, before the distribution time. In a case in which the determination is YES, it is considered that BCMCS broadcasting information is being transmitted, and thus the processing advances to Step S12, and in a case in which the determination is NO, the distribution time is awaited to come in Step S11.

In Step S12, the control unit 30 activates EVDO without activating CDMA2000_1x. By not activating CDMA2000_1x, control is performed so as to suppress communication other than BCMCS reception, such as a voice call, from occurring as much as possible. At this point in time, it is preferable for the control unit 30 to further control the communication unit 31 so as not to perform transmission processing using activated EVDO.

In Step S13, the control unit 30 starts scanning a frequency channel that enables EVDO communication. At this point in time, similarly to Step S1 in FIG. 3, in accordance with the PRL stored in the storage unit 34, the control unit 30 sequentially scans frequency, and captures a frequency channel having at least predetermined electric field intensity.

In Step S14, the control unit 30 determines whether the scanning of EVDO in Step S13 succeeded. In a case in which the determination is YES, the capturing of a frequency channel that enables EVDO communication succeeded, and thus the processing advances to Step S15. On the other hand, in a case in which the determination is NO, the processing returns to Step S13 to continue scanning a frequency channel.

In Step S15, the control unit 30 performs continuous reception of EVDO at a frequency channel, of which scanning succeeded in Step S14. As described above, the control unit 30 attempts to receive broadcasting information by maintaining the continuous reception state for at least 7 CC cycle that is a transmission cycle of broadcasting information.

In Step S16, the control unit 30 determines whether the reception of BCMCS broadcasting information in Step S15 succeeded. In a case in which the determination is YES, the processing advances to Step S17, and in a case in which the determination is NO, the processing returns to Step S13 to scan another frequency channel. More specifically, reception of broadcasting information is attempted at a frequency channel of another band class.

Based on the BCMCS broadcasting information received in Step S15, when the control unit 30 confirms the fact that the BCMCS contents that are desired to be received are being distributed, the control unit 30 starts receiving data in Step S17.

In Step S18, the control unit 30 determines whether the data reception in Step S17 is completed. In a case in which the determination is YES, the processing advances to Step S19, and in a case in which the determination is NO, the data reception in Step S17 is continued.

In Step S19, the control unit 30 terminates the activated EVDO, and suspends every radio communication, and in this state, the processing returns to Step S11.

As described above, according to the present embodiment, BCMCS broadcasting information can be received and reception of content data can be started without transmitting radio waves. Therefore, content data that is distributed at predetermined time can be received, while conforming to public rules such as those in a hospital or transportation facilities.

Second Embodiment

Descriptions are provided hereinafter regarding a second embodiment of the present invention. It should be noted that configurations similar to those of the first embodiment are assigned with the same reference symbols, and descriptions thereof are omitted or simplified.

In the present embodiment, the storage unit 34 (see FIG. 2) stores distribution time of BCMCS content data and a schedule table to be described later. In addition, in a case in which the power of the cellular telephone device 1 is OFF, processing by the control unit 30 is different from that in the first embodiment.

Case of Power OFF

Descriptions are provided for processing of BCMCS reception in a case in which the power of the cellular telephone device 1 is OFF.

Figures 6, 7:
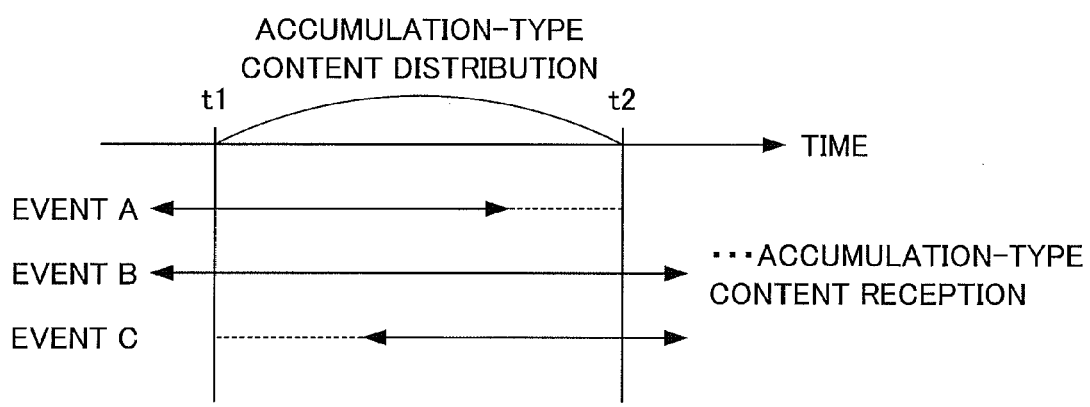
FIG. 6 is a table showing a schedule table according to a second embodiment.
FIG. 7 is a diagram showing timing for each event registered as the schedule, with regard to distribution time of accumulation-type contents according to the second embodiment.

FIG. 6 is a table showing a schedule table stored in the storage unit 34 according to the present embodiment. Events stored in the schedule table were input by the user via the operation unit 11, and the control unit 30 selects BCMCS content data to be received based on timing when the events should occur.

The schedule table stores start date and time and termination date and time of events, and flags for indicating whether the power of the cellular telephone device 1 is turned off during the corresponding events. More specifically, for example, the power-off is set for an event of going to a "hospital" where transmission of radio waves is restricted, whereas the power-off is not set for an event of going to a "restaurant" where transmission of radio waves is not restricted.

Here, for example, at the time when the "hospital" event is terminated, there is a possibility that the power may be turned on, and processing such as an incoming voice call, E-mail transmission and the like in accordance with a predetermined communication system (CDMA2000_1x or EVDO) may be performed, which will inhibit BCMCS reception. Accordingly, the control unit 30 selects content data to be received such that BCMCS reception is not performed at this point in time when the power is turned on.

The BCMCS contents are categorized into an accumulation-type content with large volume and a timely-type content with no more than predetermined volume. Since reception of the timely-type content is completed in a short period of time such as about 10 seconds, even if such reception coincides with the time when the power of the cellular telephone device 1 is turned on, the reception is completed before such activation is completed. On the other hand, in the case of the accumulation-type content, reception thereof needs to be completed by the time when the power is turned on (the finish time of an event).

FIG. 7 is a diagram showing timing for each event registered as the schedule, with regard to distribution time of accumulation-type contents according to the present embodiment. It should be noted that the power-off is set for all of events A, B and C.

Event A is an event that is in progress at content distribution start time t1, and will be completed before content distribution finish time t2. In this case, during a period from completion of the event to time t2 (a period indicated by a broken line in the drawing), there is a possibility that the power of the cellular telephone device 1 may be turned on to execute communication processing. Accordingly, the control unit 30 does not choose to receive the accumulation-type content, but chooses to receive the timely-type content with small volume.

Event B is an event that is in progress at the content distribution start time t1, and will be completed after the content distribution finish time t2. In this case, while the accumulation-type content is being distributed, there is a low possibility that the power of the cellular telephone device 1 may be turned on to execute communication processing. Accordingly, the control unit 30 chooses to receive the accumulation-type content.

Event C is an event that is not in progress at the content distribution start time t1. In this case, during a period in which the event is not registered (a period indicated by a broken line in the drawing), there is a possibility that the power of the cellular telephone device 1 may be turned on to execute communication processing. Accordingly, the control unit 30 does not choose to receive the accumulation-type content, but chooses to receive the timely-type content with small volume.

FIG. 8 is a flowchart showing processing of BCMCS reception in a case in which the power of the cellular telephone device 1 according to the present embodiment is OFF.

In Step S21, the control unit 30 determines whether the distribution time of BCMCS contents that are desired to be received is approaching, in which the distribution time is stored in the storage unit 34 in advance. More specifically, the control unit 30 determines whether there is a predetermined period of time, about a few seconds to 1 minute, before the distribution time. In a case in which the determination is YES, it is considered that BCMCS broadcasting information is being transmitted, and thus the processing advances to Step S22, and in a case in which the determination is NO, the distribution time is awaited to come in Step S21.

In Step S22, the control unit 30 activates EVDO without activating CDMA2000_1x. By not activating CDMA2000_1x, control is performed so as to suppress communication other than BCMCS reception, such as a voice call, from occurring as much as possible. At this point in time, it is preferable for the control unit 30 to further control the communication unit 31 so as not to perform transmission processing using activated EVDO.

In Step S23, by referring to the schedule table (FIG. 6) stored in the storage unit 34, the control unit 30 extracts a power-off event that is in progress at the content distribution time.

In Step S24, the control unit 30 determines whether a power-off event was extracted in Step S23. In a case in which the determination is YES, the processing advances to Step S25, and in a case in which the determination is NO, the processing advances to Step S27.

In Step S25, the control unit 30 determines whether the finish time of the event extracted in Step S23, i.e. the time when the power is turned on, is after the finish time of the accumulation-type content distribution. In a case in which the determination is YES, the processing advances to Step S26, and in a case in which the determination is NO, the processing advances to Step S27.

Here, the distribution finish time or the time required for distribution of the accumulation-type content may be stored in the storage unit 34 by receiving a notice in advance. Alternatively, such time may be received as broadcasting information, or may be specified by calculating from the volume of the content data.

In Step S26, the control unit 30 determines that the power-off state will continue during a period until the distribution finish time of the accumulation-type content, and chooses to receive the accumulation-type content.

In Step S27, the control unit 30 determines that the power may be turned on during a period between the start time and the finish time of distributing the accumulation-type content, and chooses to receive the timely-type content in order to avoid failing to receive the accumulation-type content.

In Step S28, upon confirming the BCMCS content broadcasting information selected in Step S26 or S27, the control unit 30 starts receiving the content data.

In Step S29, the control unit 30 determines whether the data reception in Step S28 is completed. In a case in which the determination is YES, the processing advances to Step S30, and in a case in which the determination is NO, the data reception in Step S28 is continued.

In Step S30, the control unit 30 terminates the activated EVDO, and suspends every radio communication, and in this state, the processing returns to Step S21.

As described above, according to the present embodiment, a type of BCMCS content (accumulation-type content or timely-type content) for receiving data is selected in accordance with the user's schedules involving operations of turning the power of the cellular telephone device 1 on and off. Therefore, the possibility of reception failure depending on the usage status of the user can be reduced.

Although embodiments of the present invention have been described above, the present invention is not limited to the aforementioned embodiments. Moreover, the effects described in the embodiments of the present invention merely exemplify the most preferable effects arising from the present invention, and the effects according to the present invention are not limited to those described in the embodiments of the present invention.

Although BCMCS reception in the power-off state has been described in the aforementioned embodiments, the scope and field of application of the present invention are not limited thereto. For example, the present invention may be applied to a case of a radio-wave-off mode in which the communication function is restricted. In this case, by restricting inputs from the operation unit 11 or restricting display on the display unit 21, the control unit 30 can suppress execution of transmission processing using activated EVDO.

In the cellular telephone device 1, transmission processing consumes considerably higher electric power than reception processing does. Since data can be received without performing such transmission processing, the power consumption can be reduced. Furthermore, by applying the configuration of the present invention to a case in which, for example, the remaining battery level falls below a predetermined level, and the mode transitions to a mode of restricting functions, data can be received while suppressing the power consumption.

In addition, although the communication unit 31 performs communication via the single antenna 32 in the aforementioned embodiments, it is not limited thereto. For example, a configuration may be employed to include a plurality of antennas, and even a plurality of communication units.

Furthermore, although a frequency channel for performing BCMCS reception is scanned and determined in the aforementioned embodiments, it is not limited thereto. For example, the storage unit 34 may store parameters (channel information) obtained before being instructed to transition to a non-radio-wave-transmission state such as a state of turning of the power or a state of turning off the radio waves, and at the distribution time of BCMCS, the control unit 30 may establish a communication session through synchronization with the channel, based on the parameters stored in the storage unit 34.

Moreover, although an example using BCMCS has been described as an example of an information distribution service in the aforementioned embodiments, the scope and field of application of the present invention are not limited thereto, and the present invention may be applied to even other information distribution services such as, for example, CBS (Cell Broadcast Service).

The invention claimed is:

1. A radio communication device that receives content data being broadcast via radio waves, the radio communication device comprising:
   a first storage unit that stores time such broadcasting is performed;
   a communication unit that is compatible with a first communication protocol that can capture a channel of the broadcasting, and a second communication protocol different from the first communication protocol;
   a control unit that controls the communication unit to start receiving the content data being broadcast, by using the first communication protocol, at the time stored in the first storage unit; and
   a second storage unit for storing a schedule that is input,
   wherein the control unit does not activate the second communication protocol when receiving the content data at the time stored in the first storage unit, in a state of having been instructed to transition to a non-radio-wave-transmission state in which radio waves are not transmitted,
   wherein, in a state of having been instructed to transition to the non-radio-wave-transmission state, when detecting that reception time stored in the first storage unit has come for first content data, the control unit refers to the schedule stored in the second storage unit, and
   wherein, in a case in which an event that is in progress at the reception time is registered, the control unit controls the communication unit to not receive the first content data if there is a possibility that the event may result in an operation involving transmission of radio waves before finish time of the broadcasting, and the control unit controls the communication unit to receive the first content data if there is not a possibility that the event may result in an operation involving transmission of radio waves before finish time of the broadcasting.

2. The radio communication device according to claim 1, wherein the second storage unit stores data that indicates time of transitioning to the non-radio-wave-transmission state, and time of cancelling the non-radio-wave-transmission state, in association with the schedule, and
   wherein the control unit determines that there is a possibility that an operation involving transmission of radio waves may occur at the time of cancelling the non-radio-wave-transmission state.

3. The radio communication device according to claim 1, wherein the non-radio-wave-transmission state is a power-off state,
   wherein the second storage unit stores data that indicates time of power-off and power-on of its own device in association with the schedule, and
   wherein the control unit determines that there is a possibility that an operation involving transmission of radio waves may occur at time of switching from power-off to power-on.

4. The radio communication device according to claim 1, wherein the communication unit obtains finish time of the broadcasting by prospectively identifying a period of time required to complete reception of the first content data.

5. The radio communication device according to claim 1, wherein, in a case in which an event that is in progress at the reception time of the first content data is not registered, the control unit determines that there is a possibility that the operation involving transmission of radio waves may occur before the finish time of the broadcasting, and does not receive the first content data.

6. The radio communication device according to claim 1, wherein, in a case in which the control unit does not receive the first content data based on determining that there is a possibility that the operation involving transmission of radio waves may occur before the finish time of the broadcasting, the control unit selects and receives second content data that is content data with no more than predetermined volume.

\* \* \* \* \*